(12) United States Patent
Rosales

(10) Patent No.: US 6,941,897 B1
(45) Date of Patent: Sep. 13, 2005

(54) RECEPTACLE ASSEMBLY FOR RECEIVING CANINE FECAL MATTER

(76) Inventor: Bayron Rosales, 205 Hickory Heights Ave., Las Vegas, NV (US) 89148

( * ) Notice: Subject to any disclaimer, the term of this patent is extended or adjusted under 35 U.S.C. 154(b) by 0 days.

(21) Appl. No.: 11/099,104

(22) Filed: Apr. 6, 2005

(51) Int. Cl.[7] ............................................. A01K 23/00
(52) U.S. Cl. .................................................... 119/868
(58) Field of Search ...................... 119/868, 867, 869; 604/385.09, 395

(56) References Cited

U.S. PATENT DOCUMENTS

| | | | | |
|---|---|---|---|---|
| 4,537,153 A | | 8/1985 | Vidal | 119/868 |
| 4,709,661 A | * | 12/1987 | Mayle, Jr. | 119/868 |
| 4,779,573 A | | 10/1988 | Vidal | 119/868 |
| 5,146,874 A | | 9/1992 | Vidal | 119/868 |
| 5,315,960 A | * | 5/1994 | Lamp | 119/868 |
| 5,355,836 A | * | 10/1994 | Vallery | 119/868 |
| 5,386,802 A | * | 2/1995 | Hang-Fu | 119/868 |
| 5,427,059 A | * | 6/1995 | Logan | 119/868 |
| 5,819,691 A | * | 10/1998 | Lavi et al. | 119/868 |
| 5,937,795 A | * | 8/1999 | Raphael | 119/869 |
| 6,394,041 B1 | * | 5/2002 | Katz | 119/868 |
| 6,457,440 B1 | * | 10/2002 | Liburd | 119/868 |
| 6,494,168 B2 | * | 12/2002 | Weng | 119/868 |
| 6,722,319 B1 | * | 4/2004 | Chiu | 119/868 |
| 6,837,187 B2 | * | 1/2005 | Berardo | 119/792 |

* cited by examiner

Primary Examiner—Yvonne R. Abbott
(74) Attorney, Agent, or Firm—Albert Bordas; Jesus Sanchelima

(57) ABSTRACT

A receptacle assembly for receiving and retaining discharge of body waste of a canine, comprising a strap assembly and a bag assembly. The strap assembly is designed to securely mount upon the body of a canine such as a dog and comprises multiple means for securing it to the canine. The bag assembly is shaped in a form resembling a pear and is made of plastic. The bag assembly comprises exterior and interior walls joined by side pleats for expansion of the bag assembly when filled with fecal matter of the canine.

6 Claims, 9 Drawing Sheets

RECEPTACLE ASSEMBLY FOR RECEIVING CANINE FECAL MATTER

BACKGROUND OF THE INVENTION

1. Field of the Invention

The present invention relates to receptacles used to receive and retain discharge from a body and more particularly, relates to a new garment designed to be worn on the body by canines, or the like, for receiving and retaining the discharge of their solid body wastes.

2. Description of the Related Art

Dogs and other mammals evacuate their intestinal contents anywhere. Not picking up after them causes the deterioration of the environment and problems to public health, mainly due to the spread diseases. Dog owners typically take their pets out for walks to spend time with them, for recreational purposes, and for exercise. These types of activities stimulate the movement of intestinal contractions, causing the movement and the fall of fecal bolus to the exterior with the help of abdominal muscles and the diaphragm.

Ideally this fecal matter should not fall to the ground, however after falling to the ground and contaminating the area; it is picked up and thrown to the trash. In most cases however, the fecal matter is not picked up at all.

Several designs for receptacles used to receive and retain discharge from a body have been designed in the past. None of them, however, includes a bag assembly secured to a strap assembly, designed to be worn on the body by canines, mammals or the like, for receiving and retaining the discharge of their solid body wastes.

Applicant believes that the closest reference corresponds to U.S. Pat. No. 5,146,874 issued to Vidal for a device with pouches for receiving animal waste, on Sep. 15, 1992. However, it differs from the present invention because Vidal teaches a garment of flexible, light weight, soft and strong material, to be worn on the body by dogs, cats, mammals or the like, provided with pouches for receiving and retaining, when in use, the discharge of their solid and fluid wastes respectively. The garment is primarily directed, in the preferred embodiments, to be worn by male and female dogs, and in one aspect it is to be worn by male or female dogs alike, comprises a wearer-contacting garment constituted by distinctive portions which are placed over selected anatomical regions of the wearer provided with one pouch located around the root of the tail and the anal region of the wearer, said pouch having a closed bottom and an entrance opening to receive and retain solid body wastes, and the garment in another aspect it is to be worn in some preferred embodiments by male dogs, and in other preferred embodiments by female dogs, comprises a wearer-contacting garment constituted by distinctive portions which are placed over selected anatomical regions of the wearer provided with two pouches, one pouch to receive and retain solid body wastes as mentioned above, and one pouch located over and around the genitalia of the wearer, having an absorbent pad positioned therein to receive and retain fluid body wastes. While the garment in the preferred embodiments is to be worn by male and female cats alike, it comprises a wearer-contacting garment constituted by distinctive portions which are placed over selected anatomical regions of the wearer provided with one pouch having an absorbent pad positioned therein, to receive and retain solid and fluid body wastes. The garment in all its preferred embodiments is provided with adjustable straps which might be plain, elasticized or of an elastic fabric, in several preferred embodiments, to fasten the garment tightly, yet comfortably and securely around the groins, the abdomen and the upper arms of the wearer, in several preferred embodiments, with several preferred fastening means. The garment in all its preferred embodiments has several preferred uses, i.e. 1) as an integral disposable garment, 2) as an integral reusable-washable garment, both uses 1) and 2) having pouches permanently affixed to the wearer-contacting garment, 3) as an attachable reusable-disposable garment, and 4) as an attachable reusable-washable garment, both uses 3) and 4) having attachable disposable or attachable reusable-washable pouches respectively, attached with fastening means to the reusable wearer-contacting garment when in use, and detached after use to be disposed of, or to be washed and reused respectively.

Applicant believes that another reference corresponds to U.S. Pat. No. 4,537,153 issued to Vidal for a Device with pouches for receiving animal waste, on Aug. 27, 1985. However, it differs from the present invention because Vidal teaches a garment of flexible, light weight, soft and strong material, to be worn in the body by dogs, cats, mammals or the like, provided with pouches for receiving and retaining, when in use, the discharge of their solid and fluid body wastes respectively. The garment is primarily directed, in the preferred embodiments, to be worn by male and female dogs, and in one aspect it is to be worn by male or female dogs alike, comprises a wearer-contacting garment constituted by distinctive portions which are placed over selected anatomical regions of the wearer provided with one pouch located around the root of the tail and the anal region of the wearer, said pouch having an aperture to receive and retain solid body wastes and having in all its preferred embodiments a bottom configured to define an apex so that solid body wastes remain confined within the apex, and the garment in another aspect it is to be worn in some preferred embodiments by male dogs and in other preferred embodiments by female dogs, comprises a wearer-contacting garment constituted by distinctive portions which are placed over selected anatomical regions of the wearer provided with two pouches, one pouch to receive and retain solid body wastes as mentioned above, and one pouch located over and around the genitalia of the wearer, having an absorbent pad positioned therein to receive and retain fluid body wastes.

Applicant believes that another reference corresponds to U.S. Pat. No. 4,779,573 issued to Vidal for a Device with pouches for receiving animal waste on Oct. 25, 1988. However, it differs from the present invention because Vidal teaches a new garment of flexible, light weight, soft and strong material, to be worn on the body by dogs, cats, mammals or the like, provided with pouches for receiving and retaining the discharge of their solid and fluid wastes. The garment is primarily directed to be worn by male and female dogs, and in one aspect it is to be worn by male or female dogs alike, comprises a wearer-contacting garment constituted by distinctive portions which are placed over selected anatomical regions of the wearer provided with one pouch located around the root of the tail and the anal region of the wearer, the pouch having a closed bottom and an entrance opening to receive and retain solid body wastes, and the garment in another aspect it is to be worn in some embodiments by male dogs, and in other embodiments by female dogs, comprises a wearer-contacting garment constituted by distinctive portions which are placed over selected anatomical regions of the wearer provided with two pouches, one pouch to receive and retain solid body wastes as mentioned above, and one pouch located over and around the genitalia of the wearer, having an absorbent pad positioned therein to receive and retain fluid body wastes. While the garment is to be worn by male and female cats alike, comprises a wearer-contacting garment constituted by distinctive portions which are placed over selected anatomical regions of the wearer provided with one pouch having an absorbent pad positioned therein, to receive and retain solid and fluid body wastes. The garment in all its embodiments is provided with adjustable straps which might be plain, elasticized or of an elastic fabric to fasten the garment tightly, yet comfortably and securely around the groins, the abdomen and the upper arms of the wearer with several fastening means. The garment has several uses, i.e. (1) as an integral disposable garment, (2) as an integral reusable-washable garment, both uses (1) and (2) having pouches permanently affixed to the wearer-contacting garment (3) as an attachable reusable-disposable garment, and (4) as an attachable reusable-washable garment, both uses (3) and (4) having attachable disposable or attachable reusable-washable pouches respectively, attached with fasteners to the reusable wearer-contacting garment when in use, and detached after use to be disposed of, or to be washed and reused respectively.

Other patents describing the closest subject matter provide for a number of more or less complicated features that fail to solve the problem in an efficient and economical way. None of these patents suggest the novel features of the present invention.

SUMMARY OF THE INVENTION

The instant invention provides a solution to avoid that fecal matter fall to the ground, and to prevent owners from having to pick it up and dispose of it, thus preventing the contamination and the spreading of diseases transmitted by canines and other mammals.

The instant invention comprises a bag and strap assembly, which can be entirely made of plastic. Plastic density or thickness of the instant invention varies according to the area of the invention; at the bag assembly, the area of deposit is thinner, and at the accordion, it is slightly thicker. It is noted that the variation of thickness at the different parts of this instant invention allows it to be used and handled better, particularly during the placement and removal of the same.

More specifically, the instant invention is an ergonomic receptacle assembly for receiving and retaining fecal discharge of body waste of a canine, comprising a strap assembly designed to securely mount upon the body of a canine such as a dog. The strap assembly is flexible and comprises adjoining first and second buttock walls. Extending upwardly from the first buttock wall is a tail wrap having a fastener. The tail wrap wraps around a tail of the canine as first means for securing the strap assembly to the canine. The tail wrap comprises a hole that aligns with the anus of the canine when the strap assembly is mounted on the canine. The hole has a first rim with engaging means. Extending in a first direction from the first buttock wall is a first tab having a first loop fastener. Extending in a second direction from the first buttock wall is a short strap. The short strap extends to a rump wall. Extending from the rump wall is a second tab having a first hook fastener and third and fourth tabs that have second and third loop fasteners. The short strap extends in the second direction around the tail of the canine until the first tab and first hook fastener align with and secure upon the first loop fastener of the tab, as second means for securing the strap assembly to the canine. Extending downwardly from the lower buttock wall is a rear wall set having long straps that extend therefrom and terminate at first ends. Extending from the first ends are a plurality of hook fasteners separated by a plurality of perforations between each of the hook fasteners. The long straps wrap around the inside thighs of the canine and to the rump, until one of the plurality of hook fasteners aligns with and is secured upon the second and third loop fasteners of the second and third tabs respectively as third means for securing the strap assembly to the canine.

The instant invention also comprises a bag assembly shaped in a form resembling a pear and is flexible. It comprises an exterior wall, upper interior wall, and lower interior wall that are joined by side pleats. The side pleats allow for expansion of the bag assembly when filled with fecal matter of the canine. The upper buttock wall rests along the buttocks of the canine and the upper interior wall adheres firmly to the upper buttock wall of the strap assembly. The exterior wall comprises pleats that allow for further expansion of the bag assembly when filled with the fecal matter. The exterior wall further comprises an accordion. The accordion expands when the tail of the canine is raised. The bag assembly also has first and second ends. The first end is narrower than the second end to resemble the pear. The first end faces upwardly and terminates at an area. The second end faces downwardly and terminates at an end. Immediately below the area is a hole having a rim. The bag assembly suspends from the strap assembly, whereby the first rim of the strap assembly having the engaging means, engages the second rim when the first hole and the second hole align.

The lower buttock wall further comprises first and second connectors, each having third hook fasteners. The lower interior wall attaches to the third hook fasteners of the connectors. The connectors serve to minimize the separation between the strap assembly and the bag assembly, and minimize any swinging of the bag assembly. Ventilation means include vent tubes protruding from the bag assembly. The vent tubes have sufficient curvature to shapely contour the canine in any position, and comprises ribs to facilitate bending of the vent tubes and holes to allow the ventilation means to reach the anus of the canine for stimulating movement of intestinal contractions. A tail brace may extend from the rump wall and secures on a short tail.

It is therefore one of the main objects of the present invention to provide a receptacle assembly for receiving fecal matter of a canine that is anatomically designed to perfectly adapt to the anatomy and physiological necessities of a canine such as a dog.

It is another object of this invention to provide a receptacle assembly for receiving fecal matter of a canine that is hygienic and prevents contamination and dissemination of animal diseases from the fecal matter.

It is another object of this invention to provide a receptacle assembly for receiving fecal matter of a canine comprising polypropylene in the strap assembly.

It is another object of this invention to provide a receptacle assembly for receiving fecal matter of a canine that is easy to mount and remove from the body of the canine.

It is another object of this invention to provide a receptacle assembly for receiving fecal matter of a canine that is impervious.

It is another object of this invention to provide a receptacle assembly for receiving fecal matter of a canine that contains matter for lab studies.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 8A is a perspective view of one of vent tubes 95'.

DETAILED DESCRIPTION OF THE PREFERRED EMBODIMENT

Figure 1:
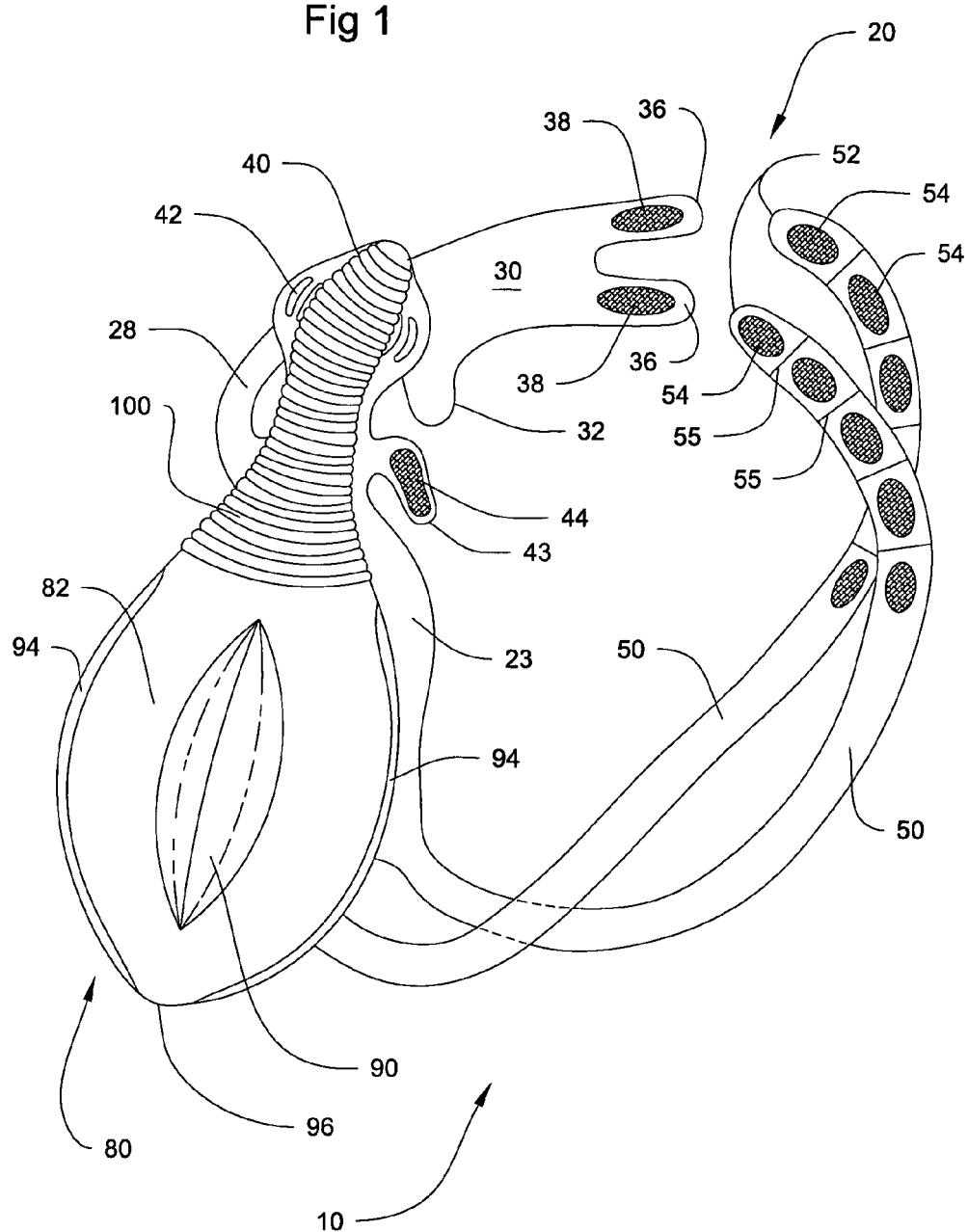
FIG. 1 represents a perspective view of the preferred embodiment of the instant invention.

Referring now to the drawings, where the present invention is generally referred to with numeral 10, it can be observed that it basically includes strap assembly 20 and bag assembly 80.

As seen in FIG. 1, instant invention 10 comprises bag assembly 80 secured to strap assembly 20. Instant invention 10 is designed to mount onto a canine C, such as the one seen in FIG. 4, whereby strap assembly 20 securely mounts upon the body of a canine C such as a dog. In the preferred embodiment, instant invention 10 is disposable, designed for a single use.

Figure 2:
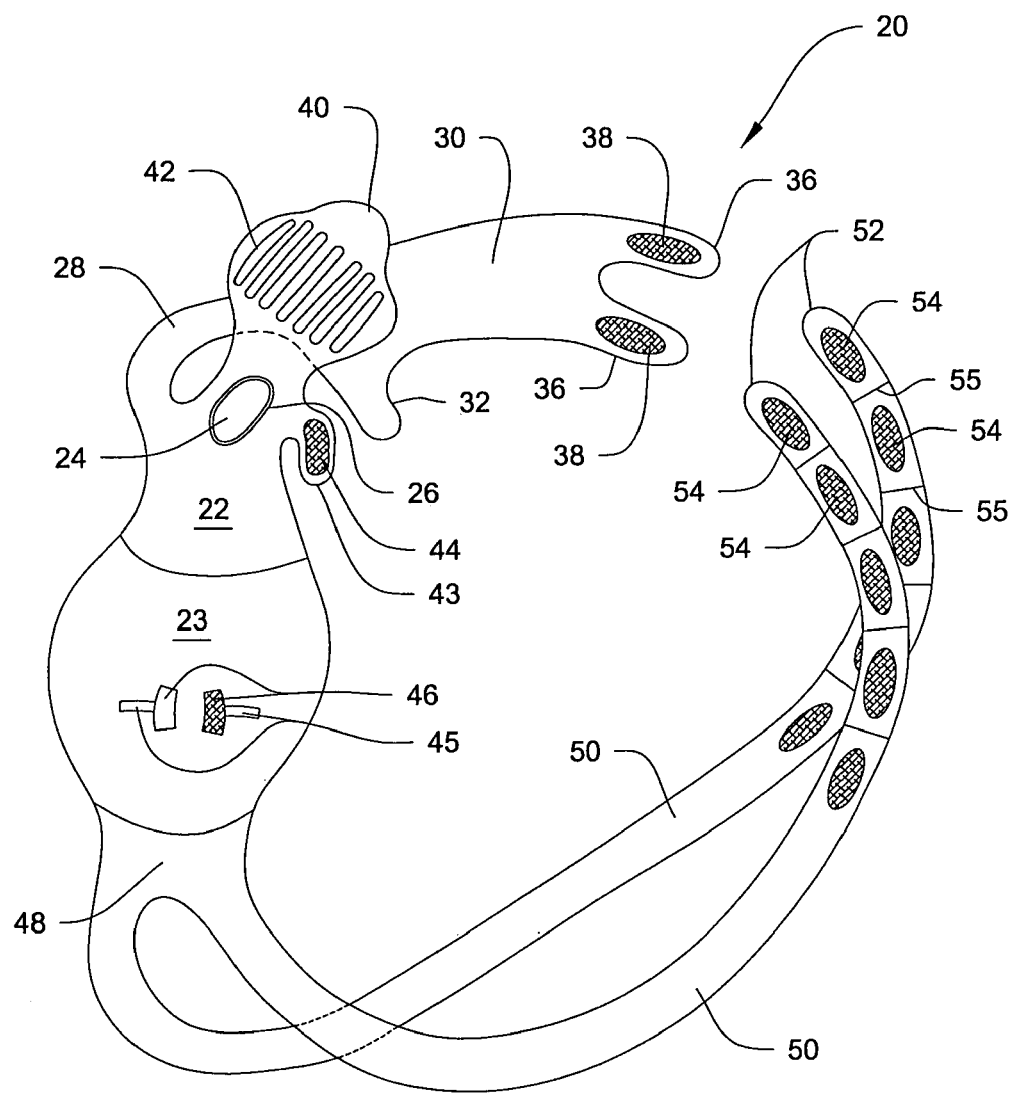
FIG. 2 shows a perspective view of the preferred embodiment of the strap assembly.

As seen in FIG. 2, strap assembly 20 is designed to securely mount upon the body of a canine C such as a dog. Strap assembly 20 is made of two layers of polypropylene, between these two layers, there is a sponge sheet, which allows, strap assembly 20 to be more consistent and easier to use. Strap assembly 20 comprises upper and lower buttock walls 22 and 23 respectively, shaped in a form resembling a pear, wherein the narrower end of upper buttock wall 22 faces upwardly and the wider end of lower buttock wall 23 faces downwardly.

Extending upwardly from upper buttock wall 22 is tail wrap 40 having fastener 42. Illustrated is the exterior side of upper buttock wall 22. When in use, the interior side of the upper buttock wall 22 rests along the buttocks of the canine C. With strap assembly 20 mounted onto the canine C, tail wrap 40 wraps around the tail T of the canine C. Once wrapped, fastener 42 is secured, whereby it adheres to itself, as means for securing. Tail wrap 40 comprises hole 24 that aligns with the anus of the canine C when strap assembly 20 is mounted thereon. Hole 24 has rim 26 having means of engaging that allows engaging of rim 88 of bag assembly 80, seen in FIG. 3, when holes 24 and 86 align. Extending rightwardly from tail wrap 40 is tab 43 having loop fastener 44. Extending leftwardly from tail wrap 40 is short strap 28. Short strap 28 extends to rump wall 30. Extending from rump wall 30 is tab 32 having a hook fastener on its other side, not seen, and tabs 36 having loop fasteners 38. With strap assembly 20 mounted onto the canine C, tail wrap 40 wraps around the tail T of the canine C, and short strap 28 extends leftwardly around the tail T of the canine C until tab 32 having the hook fastener, aligns with and is secured upon loop fastener 44 of tab 43 as means for securing. Extending downwardly from lower buttock wall 23 is rear wall set 48 having long straps 50 extending therefrom that terminate at ends 52. At predetermined positions from ends 52 are a plurality of hook fasteners 54 separated by a plurality of perforations 55 between each of them. With strap assembly 20 mounted onto the canine C, long straps 50 wrap around the inside of the thighs between the pleat of the legs of the canine C and onto the rump R of the canine C, until one of the plurality of hook fasteners 54 aligns with and is secured upon loop fasteners 38 of tabs 36 as means for securing. This allows strap assembly 20 to be adjusted to the size of the canine C. If desired, the remaining plurality of hook fasteners 54 not utilized may be discarded by severing at the desired perforations 55.

Figure 3:
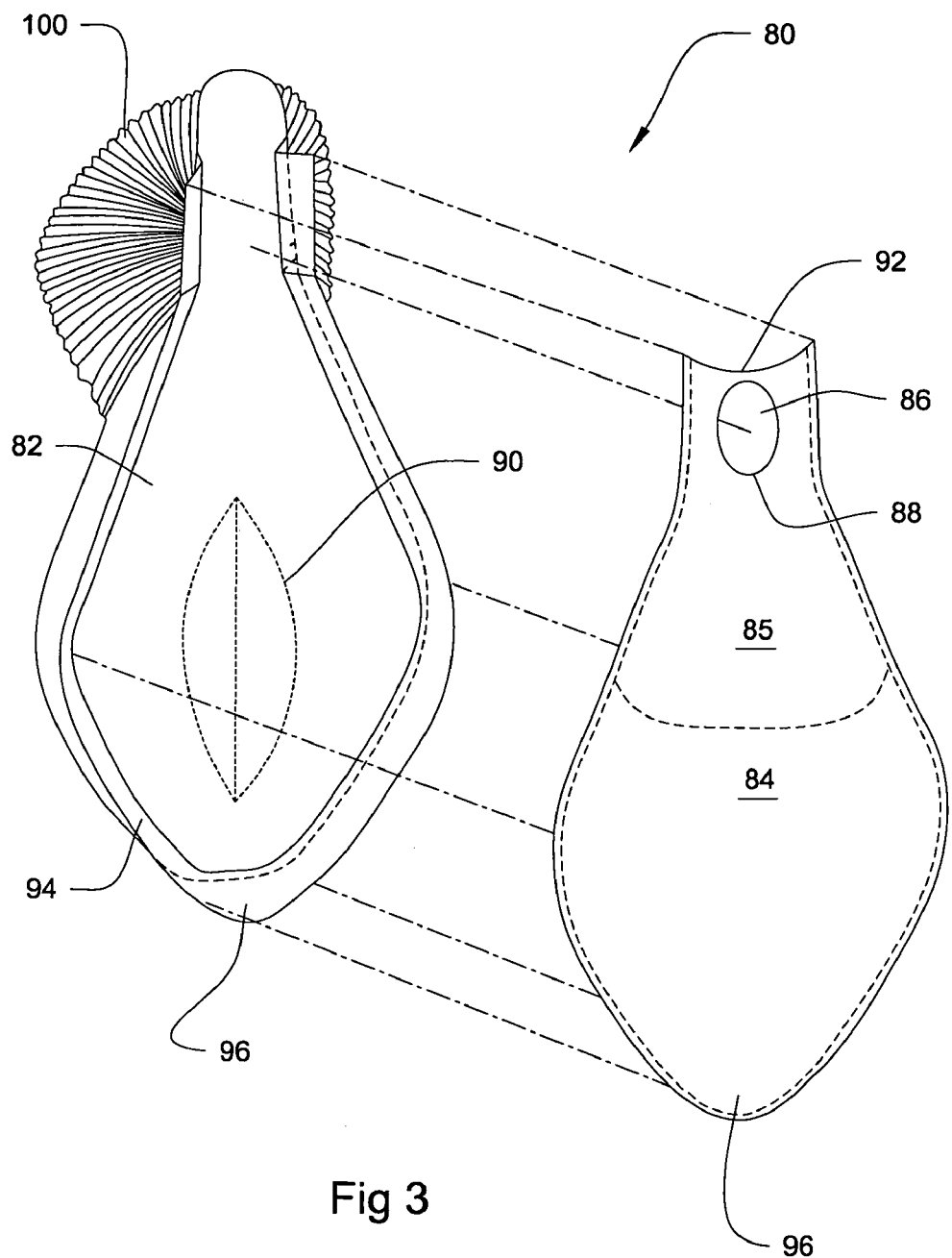
FIG. 3 illustrates a cut view of the preferred embodiment of the bag assembly.

In the preferred embodiment, upper interior wall 85 of bag assembly 80, seen in FIG. 3, adheres firmly to the exterior side of upper buttock wall 22 of strap assembly 20. In use, when the canine C is walking or running and bag assembly 80 has fecal matter within, bag assembly 80 has a tendency to swing forward and backward. Connectors 45 serve to minimize the separation between strap assembly 20 and bag assembly 80, and minimize any swinging of bag assembly 80. More specifically, connectors 45 have hook fasteners 46 that align with and secure upon lower interior wall 84, seen in FIG. 3.

Seen in FIG. 3 is a single bag assembly 80 split in two parts for illustrative purposes. Bag assembly 80 receives and retains the canine C fecal matter. Bag assembly 80 comprises exterior wall 82, lower interior wall 84 and upper interior wall 85. Bag assembly 80 is also made of plastic and is shaped in a form resembling a pear. Bag assembly 80 is shaped wherein the narrower end of upper interior wall 85 faces upwardly and terminates at area 92, and the wider end of lower interior wall 84 faces downwardly and terminates at end 96. Immediately below area 92 is hole 86 having rim 88. Area 92 is very narrow since the space between the canine C upper edge of the anus and the tail's T pleat is very narrow. Exterior wall 82 comprises pleats 90 that allow for expansion as bag assembly 80 is filled with fecal matter. Exterior wall 82 also comprises accordion 100 that expands when the tail T of the canine C is raised. Side pleats 94 join exterior wall 82 and, lower interior wall 84 and upper interior wall 85, to allow for expansion as bag assembly 80 is filled with fecal matter. Bag assembly 80 suspends from strap assembly 20, whereby rim 26 of strap assembly 20 has means of engaging that allow engaging of rim 88 when holes 24 and 86 align. In the preferred embodiment, upper interior wall 85 adheres firmly to the exterior side of upper buttock wall 22 of strap assembly 20.

To mount instant invention 10 onto the canine C, it is necessary for the canine C to be peaceful, calm and relax. While aligning the anus of the canine C with hole 24, the installer secures tail wrap 40 approximately to the third proximal of the tail T by wrapping it around the tail T. Once wrapped, fastener 42 is secured, whereby it adheres to itself. Next, rump wall 30 is positioned on the rump R of the canine C and short strap 28 extends leftwardly around the tail T of the canine C until tab 32 having the hook fastener, aligns with and is secured upon loop fastener 44 of tab 43 as means for securing. Next, long straps 50 wrap around the inside of the thighs between the pleat of the legs of the canine C and to the rump R until one of the plurality of hook fasteners 54 aligns with and is secured upon loop fasteners 38 of tabs 36 as means for securing.

Figure 4:
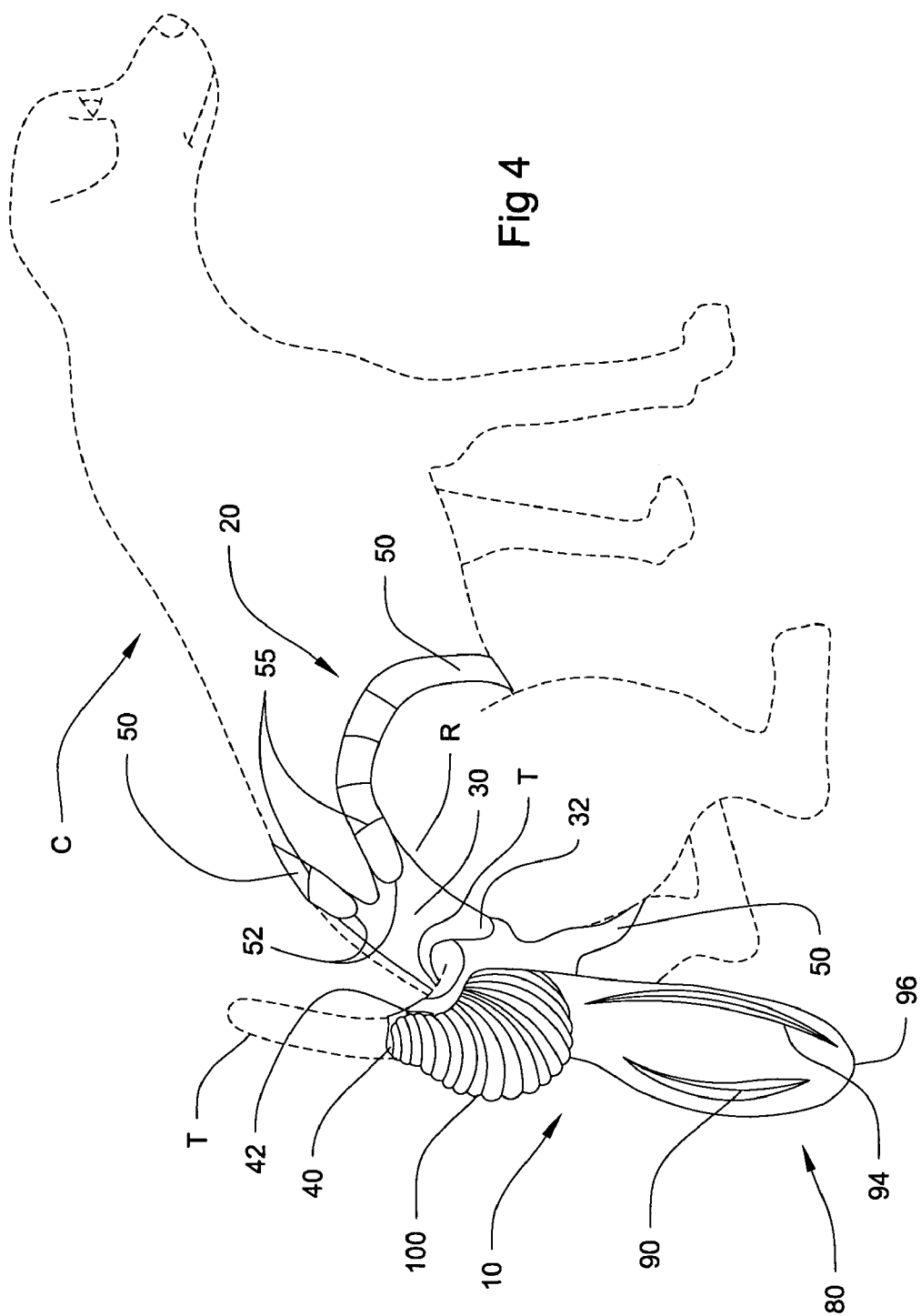
FIG. 4 is a representation of the preferred embodiment of the instant invention as used by a canine.
Figure 5:
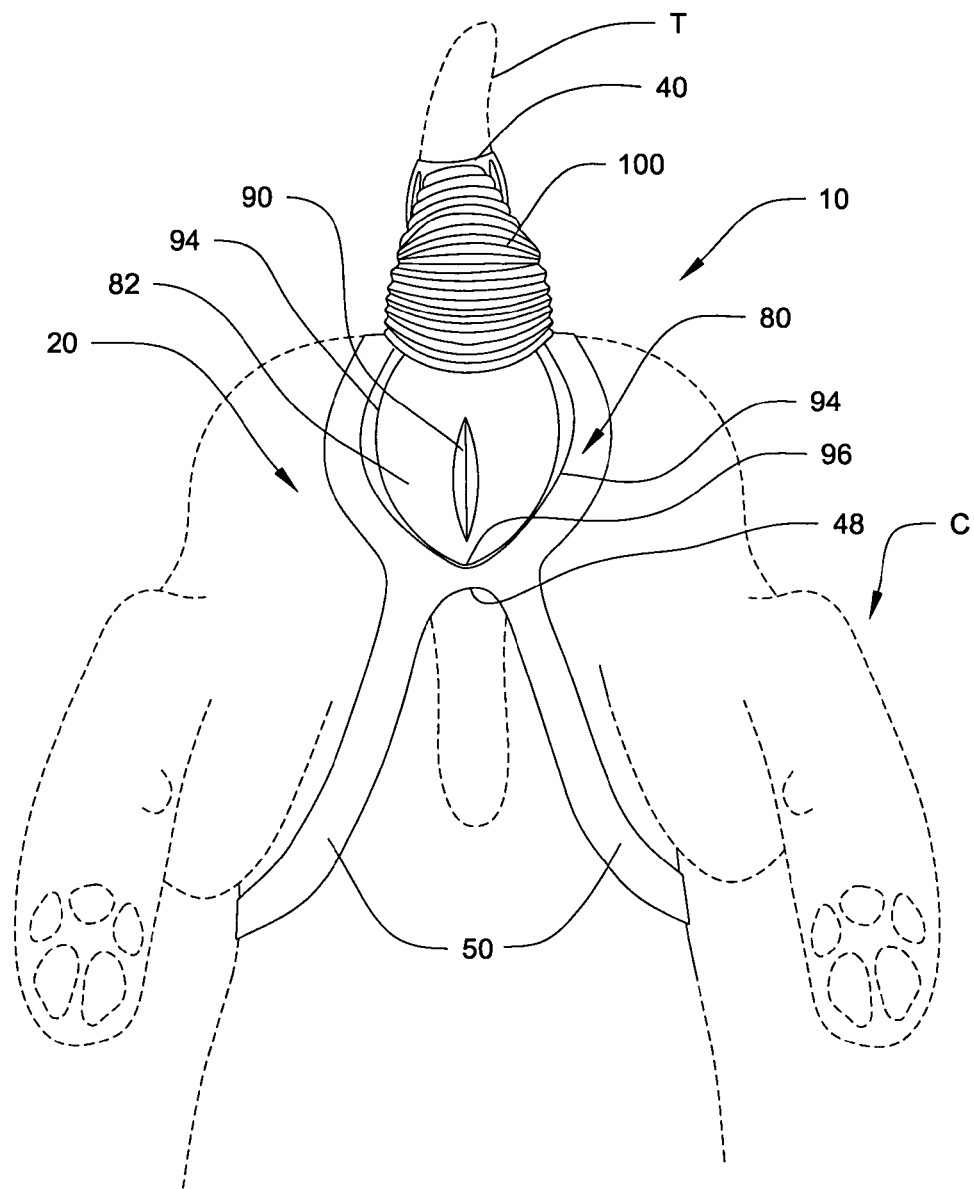
FIG. 5 is a bottom view of the preferred embodiment of the instant invention as used by a canine.

In use as seen in FIGS. 4 and 5, when the canine C gets ready to have intestinal evacuation of fecal matter, it typically tilts its body, bends down, stretches and lifts its tail T. Accordion 100 expands as the canine C lifts its tail T, clearing the way for the fecal matter to fall by gravity into bag assembly 80. In the canine C position defined above, to have intestinal evacuation of fecal matter, bag assembly 80 is in a generally vertical position due to the upper interior wall 85 adhering firmly to the exterior side of upper buttock wall 22 of strap assembly 20, and lower interior wall 84 hanging downwardly.

When the act of intestinal evacuation is done, the installer and canine C approach a place for garbage disposal, such as a garbage container. The installer removes instant invention 10 in the reverse order of mounting, and ties bag assembly 20 immediately below hole 86 with tab 32 having its hook fastener and securing onto loop fastener 44 of tab 43, to prevent the fecal matter from coming out of bag assembly 80. Instant invention 10 is then discarded. In use, instant invention 10 may be mounted onto the canine C with necessary frequency, according to the individual habits of the canine C.

In the preferred embodiment, instant invention 10 is entirely made of a plastic such as polypropylene, which could be very useful in some animals the sweat a lot, as in the case of the equines.

The hook and loop fasteners described above may be replaced with other means of fastening, such as adhesive strips with glue. Rump wall 30 and its respective tabs 32 and 36, and long straps 50 may vary in size, length, and shape, depending on the type of canine C that will wear instant invention 10. In the preferred embodiment, instant invention 10 is entirely made of a plastic such as polypropylene, which could be very useful in some animals the sweat a lot, as in the case of the equines.

It is noted that the first and second alternate embodiments defined below comprise all the functional characteristics and parts of the preferred embodiment, except for the modifications defined by the prime and double prime numbers defined below.

Figure 6:
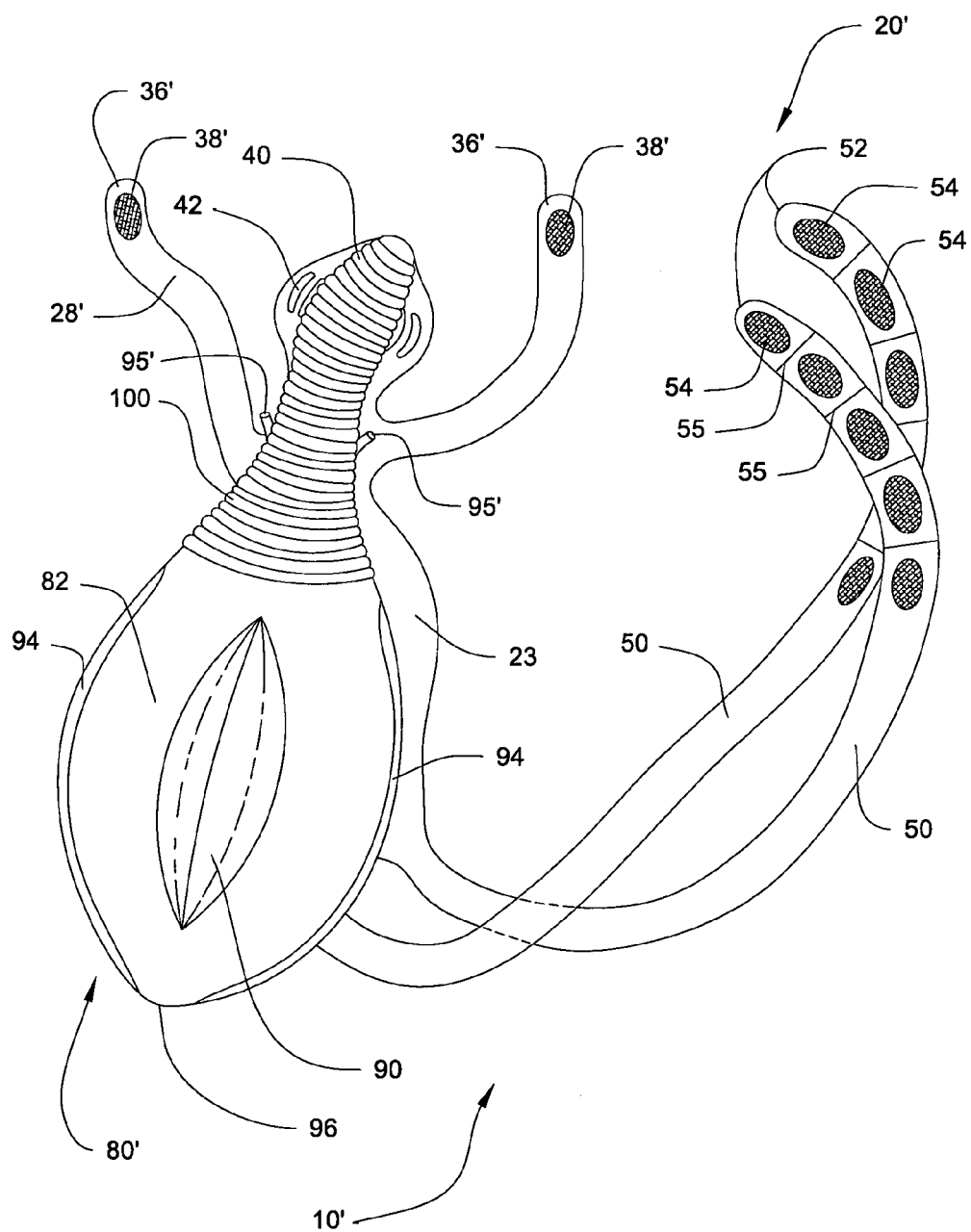
FIG. 6 represents a perspective view of a first alternate embodiment of the instant invention.

As seen in FIG. 6, the first alternate embodiment of the instant invention 10' comprises bag assembly 80' secured to strap assembly 20'. Instant invention 10' is designed to mount onto a canine C, such as the one seen in FIG. 8, whereby strap assembly 20' securely mounts upon the body of a canine C such as a dog. In the first alternate embodiment, instant invention 10' is also disposable, designed for a single use.

Strap assembly 20' is made of two layers of polypropylene, between these two layers, there is a sponge sheet, which allows, strap assembly 20' to be more consistent and easier to use. Strap assembly 20' comprises upper buttock wall 22, seen in FIG. 2, and lower buttock wall 23, shaped in a form resembling a pear, wherein the narrower end of upper buttock wall 22 faces upwardly and the wider end of lower buttock wall 23 faces downwardly.

Extending upwardly from upper buttock wall 22 is tail wrap 40 having fastener 42. When in use, the interior side of the upper buttock wall 22 rests along the buttocks of the canine C. With strap assembly 20' mounted onto the canine C, tail wrap 40 wraps around the tail T of the canine C. Once wrapped, fastener 42 is secured, whereby it adheres to itself, as means for securing. Tail wrap 40 comprises hole 24, seen in FIG. 2 that aligns with the anus of the canine C when strap assembly 20' is mounted thereon. Hole 24 has rim 26, seen in FIG. 2, having means of engaging that allows engaging of rim 88 of bag assembly 80', seen in FIG. 7, when holes 24 and 86 align.

Extending rightwardly from tail wrap 40 is short strap 43'. Extending leftwardly from tail wrap 40 is short strap 28'. Extending downwardly from lower buttock wall 23 is rear wall set 48, seen in FIG. 2, having long straps 50 extending therefrom that terminate at ends 52. At predetermined positions from ends 52 are a plurality of hook fasteners 54 separated by a plurality of perforations 55 between each of them. With strap assembly 20' mounted onto the canine C, long straps 50 wrap around the inside of the thighs between the pleat of the legs of the canine C and onto the rump R of the canine C, until one of the plurality of hook fasteners 54 aligns with and is secured upon loop fasteners 38' of tabs 36' as means for securing. This allows strap assembly 20' to be adjusted to the size of the canine C. If desired, the remaining plurality of hook fasteners 54 not utilized may be discarded by severing at the desired perforations 55.

Figure 7:
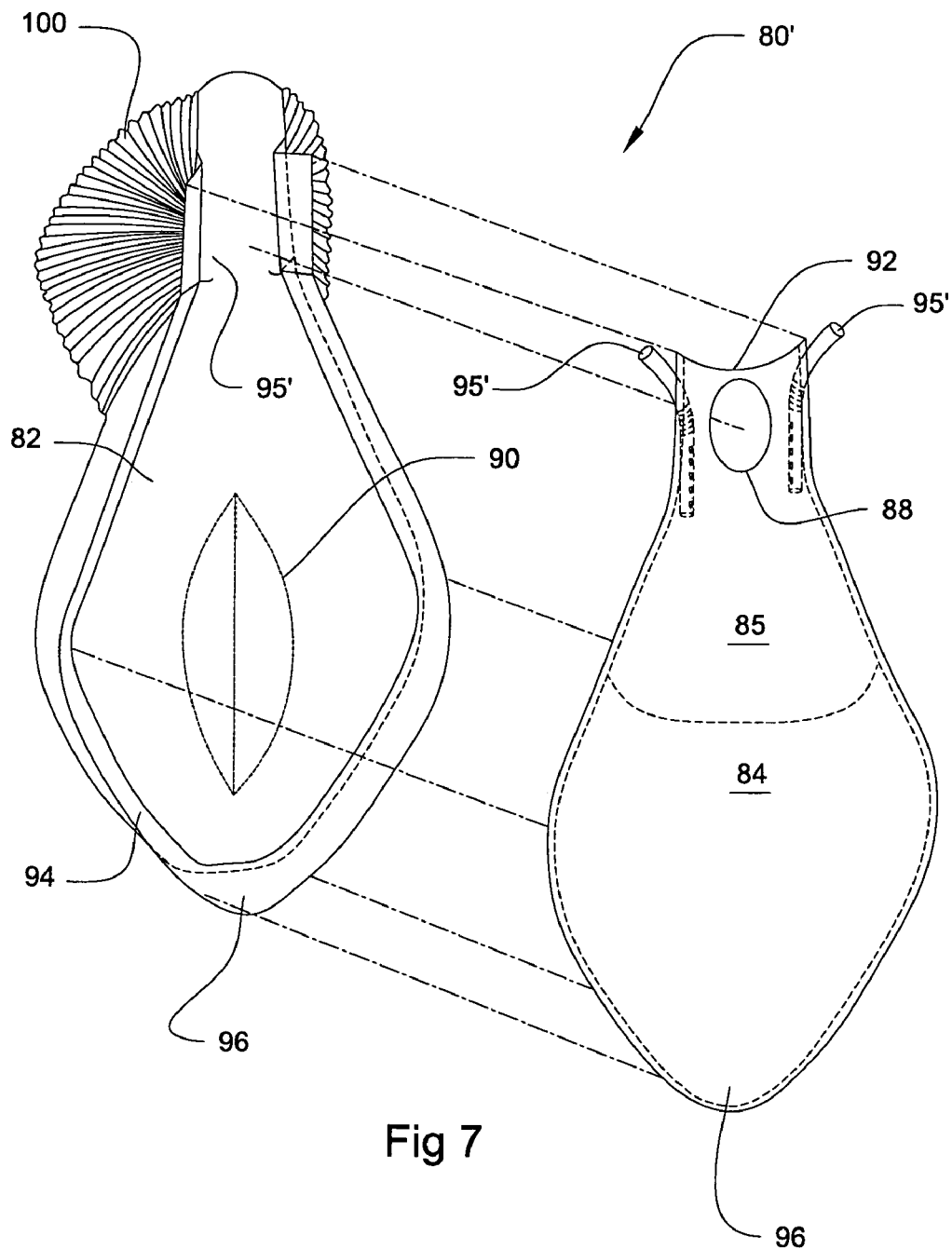
FIG. 7 illustrates a cut view of the first alternate embodiment of the bag assembly.

Seen in FIG. 7 is a single bag assembly 80' split in two parts for illustrative purposes. Bag assembly 80' receives and retains the canine C fecal matter. Bag assembly 80' comprises exterior wall 82, lower interior wall 84 and upper interior wall 85. Bag assembly 80' is also made of plastic and is shaped in a form resembling a pear. Bag assembly 80' is shaped wherein the narrower end of upper interior wall 85 faces upwardly and terminates at area 92, and the wider end of lower interior wall 84 faces downwardly and terminates at end 96. Immediately below area 92 is hole 86 having rim 88. Area 92 is very narrow since the space between the canine C upper edge of the anus and the tail's T pleat is very narrow. Exterior wall 82 comprises pleats 90 that allow for expansion as bag assembly 80' is filled with fecal matter. Exterior wall 82 also comprises accordion 100 that expands when the tail T of the canine C is raised. Side pleats 94 join exterior wall 82 and, lower interior wall 84 and upper interior wall 85, to allow for expansion as bag assembly 80' is filled with fecal matter. Bag assembly 80' suspends from strap assembly 20', whereby rim 26 of strap assembly 20' has means of engaging that allow engaging of rim 88 when holes 24 and 86 align. In this embodiment, upper interior wall 85 adheres firmly to the exterior side of upper buttock wall 22 of strap assembly 20'. In this embodiment, bag assembly 80' further comprises vent tubes 95' positioned on each side of rim 88. Vent tubes 95' serve as ventilation means to allow air to enter into bag assembly 80' for ventilation and to facilitate its expansion. It is noted that vent tubes 95' may also serve as ventilation means to allow air to enter into bag assembly 80 for ventilation and to facilitate its expansion.

Figure 8:
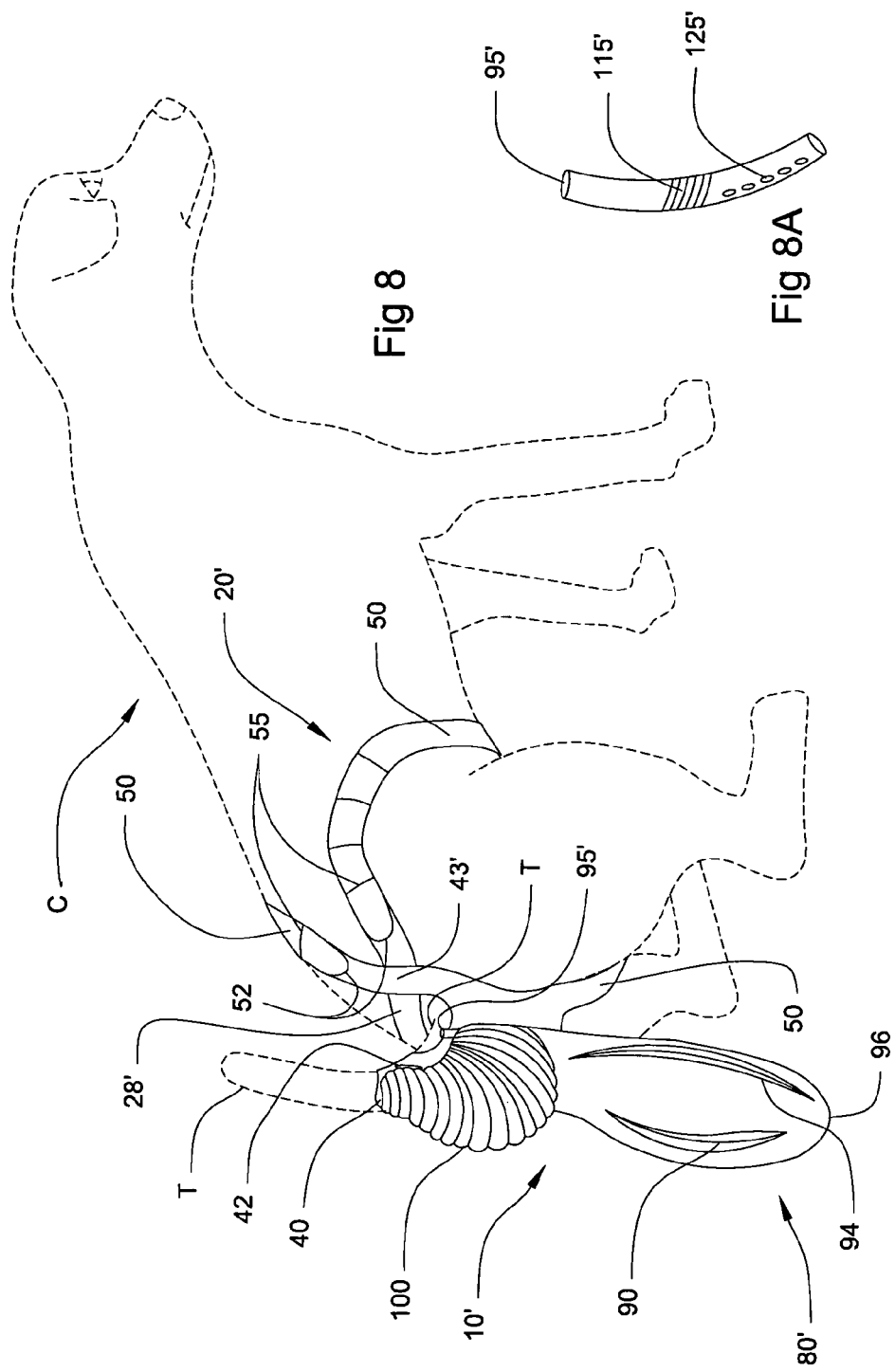
FIG. 8 is a representation of the first alternate embodiment of the instant invention as used by a canine.

As seen in FIG. 8, to mount instant invention 10' onto the canine C, it is necessary for the canine C to be peaceful, calm and relax. While aligning the anus of the canine C with hole 24, seen in FIG. 2, the installer secures tail wrap 40 approximately to the third proximal of the tail T by wrapping it around the tail T. Once wrapped, fastener 42 is secured, whereby it adheres to itself. Next, short strap 28' extends leftwardly around the tail T, and short strap 43' extends rightwardly around the tail T of the canine C and may cross over short strap 28' as illustrated. Next, long straps 50 wrap around the inside of the thighs between the pleat of the legs of the canine C and to the rump R until one of the plurality of hook fasteners 54 aligns with and is secured upon loop fasteners 38' of tabs 36' as means for securing. As seen in this illustration, vent tubes 95' serve to allow air to enter into bag assembly 80' for ventilation and to facilitate its expansion.

Seen in FIG. 8A is one of vent tubes 95'. It is noted that vent tubes 95' have sufficient curvature to contour the shape of the canine C in any position, and especially when in the position illustrated in FIG. 8. Vent tubes 95' may comprise ribs 115' to facilitate bending of vent tubes 95' and holes 125' to allow the ventilation means to reach the anus of canine C. It is noted that holes 125' are directed in the direction of the anus for stimulating the movement of intestinal contractions, causing the movement and the fall of fecal bolus to the exterior with the help of abdominal muscles and the diaphragm.

Figure 9:
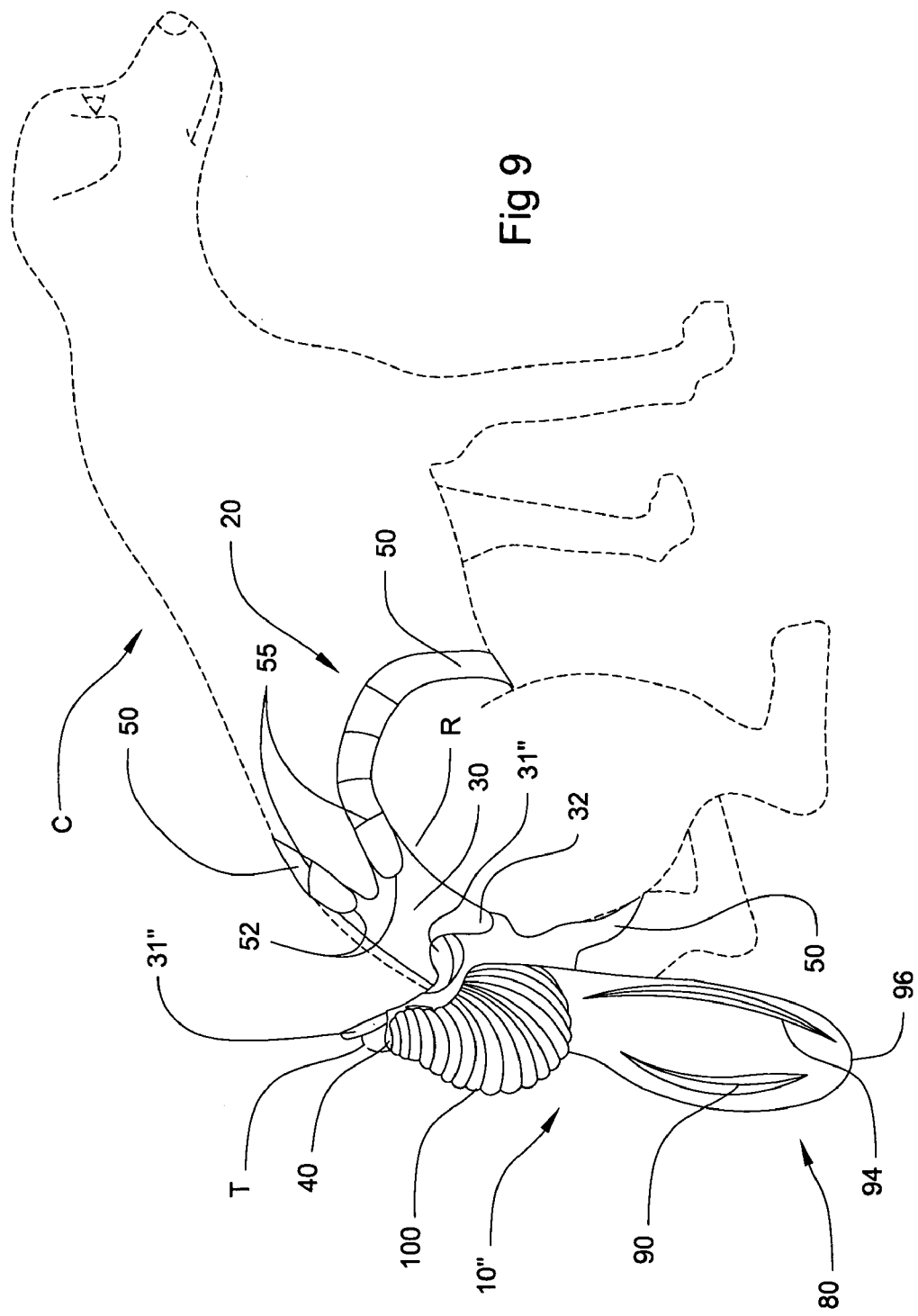
FIG. 9 is a representation of a second alternate embodiment of the instant invention as used by a canine.

As seen in FIG. 9, the second alternate embodiment of instant invention 10" comprises tail brace 31" that further supports instant invention 10" on a short tail T. Tail brace 31" extends from rump wall 30 and is secured directly over tail T by tail wrap 40 as illustrated.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An ergonomic receptacle assembly for receiving and retaining fecal discharge of body waste of a canine, comprising:

A) a strap assembly (20) designed to securely mount upon the body of a canine such as a dog said strap assembly (20) flexible and comprises adjoining first and second buttock walls (22) and (23), extending upwardly from said first buttock wall (22) is tail wrap (40) having fastener (42), said tail wrap (40) wraps around a tail of said canine as first means for securing said strap assembly (20) to said canine, said tail wrap (40) comprises a hole (24) that aligns with the anus of said canine when said strap assembly (20) is mounted on said canine, said hole (24) having a first rim (26) with engaging means, extending in a first direction from said first buttock wall (22) is first tab (43) having first loop fastener (44), extending in a second direction from said first buttock wall (22) is short strap (28), said short strap (28) extends to a rump wall (30), extending from said rump wall (30) is second tab (32) having first hook fastener and third and fourth tabs (36) having second and third loop fasteners (38), said short strap (28) extends in said second direction around the tail of said canine until said first tab (32) having said first hook fastener aligns with and is secured upon said first loop fastener (44) of said tab (43), as second means for securing said strap assembly (20) to said canine, extending downwardly from said lower buttock wall (23) is rear wall set ((48)) having long straps (50) extending therefrom and terminating at first ends (52), extending from said first ends (52) are a plurality of hook fasteners (54) separated by a plurality of perforations (55) between each of said hook fasteners (54), said long straps (50) wrap around the inside thighs of said canine and to said rump, until one of said plurality of hook fasteners (54) aligns with and is secured upon said second and third loop fasteners (38) of said second and third tabs (36) respectively, as third means for securing said strap assembly (20) to said canine; and B) a bag assembly (80) shaped in a form resembling a pear and made of flexible material, comprising exterior wall (82), upper interior wall (85), and lower interior wall (84) joined by side pleats (94), said side pleats (94) allow for expansion of said bag assembly (80) when filled with fecal matter of said canine, said upper buttock wall (22) rests along the buttocks of said canine and said upper interior wall (85) adheres firmly to said upper buttock wall (22) of said strap assembly (20), said exterior wall (82) comprises pleats (90) that allows for further expansion of said bag assembly (80) when filled with said fecal matter, said exterior wall (82) further comprising an accordion (100), said accordion (100) expands when said tail of said canine is raised, said bag assembly (80) also having first and second ends, said first end narrower than said second end to resemble said pear, said first end faces upwardly and terminates at area (92), said second end faces downwardly and terminates at end (96), immediately below said area (92) is hole (86) having rim (88), said bag assembly (80) suspends from said strap assembly (20) whereby said first rim (26) of said strap assembly (20) having said engaging means engages said second rim (88) when said first hole (24) and said second hole align.

2. The ergonomic receptacle assembly for receiving and retaining fecal discharge of body waste of a canine according to claim 1, further characterized in that said lower buttock wall (23) further comprises first and second connectors (45) each having third hook fasteners (46).

3. The ergonomic receptacle assembly for receiving and retaining fecal discharge of body waste of a canine according to claim 2, further characterized in that said lower interior wall (84) attaches to said third hook fasteners (46) of connectors (45), said connectors (45) serve to minimize the separation between said strap assembly (20) and said bag assembly (80) and minimize any swinging of said bag assembly (80), furthermore, serving to keep bag assembly (80) upright when said tail of said canine is raised.

4. The ergonomic receptacle assembly for receiving and retaining fecal discharge of body waste of a canine according to claim 3, further comprising ventilation means including vent tubes (95') protruding from bag assembly (80), said vent tubes (95') have sufficient curvature to shapely contour said canine (C) in any position, and comprise ribs (115') to facilitate bending of said vent tubes (95') and holes (125') to allow said ventilation means to reach the anus of said canine for stimulating movement of intestinal contractions.

5. The ergonomic receptacle assembly for receiving and retaining fecal discharge of body waste of a canine according to claim 4, further comprising comprises a tail brace (31") extending from said rump wall (30) and secured on a short tail (T).

6. The ergonomic receptacle assembly for receiving and retaining fecal discharge of body waste of a canine according to claim 3, further comprising ventilation means including vent tubes (95') protruding from bag assembly (80').

* * * * *